June 24, 1924.
M. KAHNE
SECURITY BABY CARRIAGE
Filed Dec. 22, 1923    2 Sheets-Sheet 1
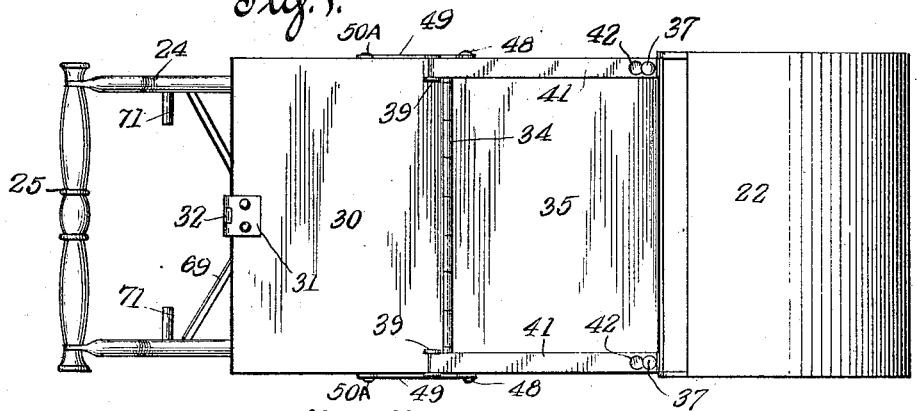
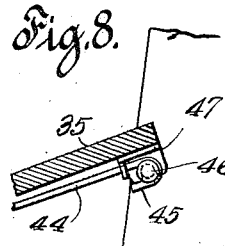
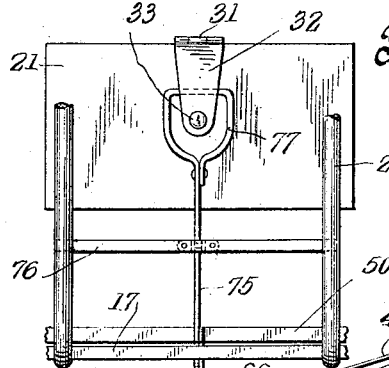
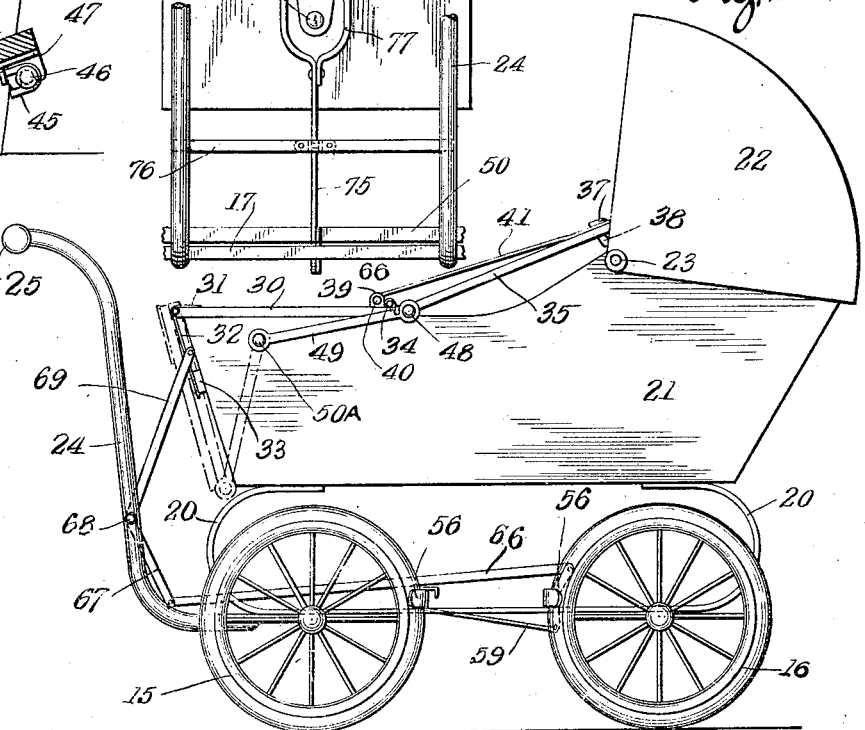
INVENTOR
Michael Kahne
BY
Charles L. Wright
ATTORNEY June 24, 1924.
M. KAHNE
SECURITY BABY CARRIAGE
Filed Dec. 22, 1923
1,499,108
2 Sheets-Sheet 2
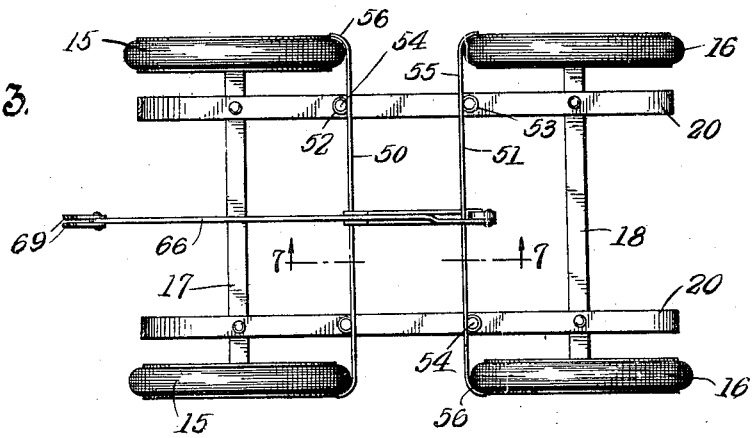
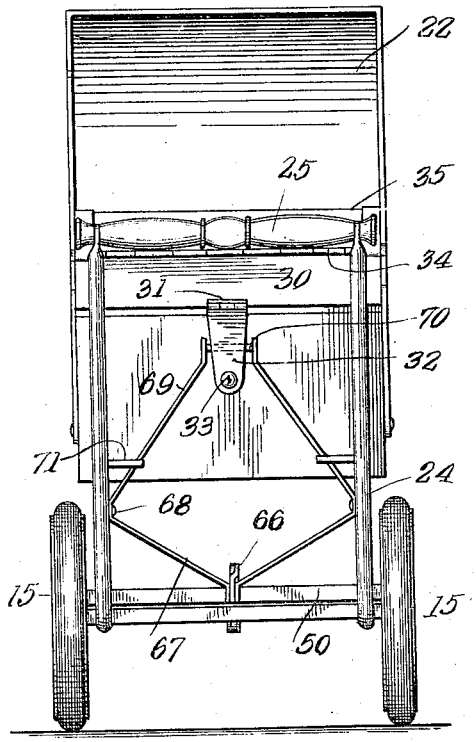
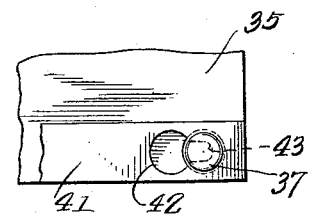
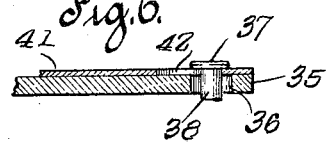
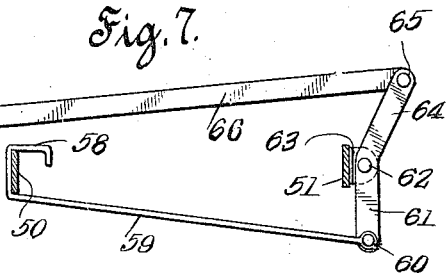
INVENTOR
Michael Kahne
BY
Charles L. Wright
ATTORNEY Patented June 24, 1924.

1,499,108

UNITED STATES PATENT OFFICE.

MICHAEL KAHNE, OF NEW YORK, N. Y.

SECURITY BABY CARRIAGE.

Application filed December 22, 1923. Serial No. 682,344.

*To all whom it may concern:*

Be it known that I, MICHEAL KAHNE, a citizen of the United States, and a resident of the city, county, and State of New York, have invented certain new and useful Improvements in Security Baby Carriages, of which the following is a specification.

This invention relates to safety devices as applied to baby carriages and has as one of its objects to provide means for preventing the removal of an infant from the carriage when the device is extended in operative position and which when retracted offers no impediments to the ordinary use of the vehicle.

Another purpose is to produce a wheel braking or locking device the operative element of which is interengaged with theft preventing device so that both are secured by a single locking element.

A further aim is in the provision of simple and inexpensive devices that can be readily incorporated in a baby carriage structure and which present no disfigurement to the vehicle.

These and like other objects are attained by the novel construction and combination of parts hereinafter described and shown in the accompanying drawing, forming part hereof, and in which:—

Figure 1 is a top plan view of the conventional type of baby carriage illustrating the application of the invention.

Figure 2 is a side elevational view of the same, both figures showing the parts extended in operative position.

Figure 3 is a plan view of the running gear or frame below the body.

Figure 4 is a rear elevational view of the entire structure.

Figure 5 is an enlarged fragmentary plan view of the safety plate engaging device to the hood.

Figure 6 is a sectional view of the same.

Figure 7 is an enlarged transverse sectional view taken on line 7—7 of Figure 3.

Figure 8 is a fragmentary sectional view, similar to Figure 6, but showing a modified fastening means.

Figure 9 is a fragmentary front elevational view, similar to Figure 4 but showing a modified form of catch.

Referring more in detail to the drawings, the carriage will be seen to rest upon two pairs of spoked wheels 15 and 16 respectively at the front and rear.

These wheels rotate on the ends of axles 17 and 18 connected in spaced parallel relation by bars over which are secured steel straps bent to present spaced inreaching ends constituting springs 20 on which is fixed the carriage body 21.

Said body is provided with a hood 22 pivoted at 23 to the raised head end of the carriage, and in all respects of the usual type.

A pair of bent lever bars 24 are secured at their lower inner ends to the reach bar and are connected at their out-turned upper ends by a handle bar 25 by which the carriage is propelled and guided.

A partial cover plate 30 is adapted to reach across the carriage body from side to side and approximately over one third its length, this plate having fixed at the center of its front edge a hinge leaf 31, the mating leaf element 32 of which is adapted to extend downward closely adjacent the foot end of the carriage body.

The hinge leaf 32 is provided with an opening receptive of a lock 33 fixed in the carriage end as best shown in Figure 4, by which it may be held from movement.

Engaged to the rear cover plate 30 by a hinge 34 at its opposite edge, is another front cover plate 35 having openings 36 near its outer corners, through which may pass the heads 37 of studs 38 fixed in the hood 22 adjacent the pivots 23, these pivots, when engaged in the plate 35, preventing movement of the hood.

Although the plates 30 and 35 are shown as solid planes, it will be understood that the same may be panelled, latticed or made of woven reeds or the like to permit of ventilation and fulfill their function of presenting an effective guard to prevent removal of an infant.

Fixed on the rear plate 30, adjacently the front of the ends of the hinge 34 are lugs 39 carrying pivots 40 on which are mounted relatively thin and narrow metal strap bars 41 having circular openings 42 at their outer ends and communicating with narrow slots 43, the openings permitting the passage of the stud heads 37 and the slots 43 being suited to receive the stems 38 so as to become lockingly engaged therewith, over the front plate 35 and thus hold it in fixed position. When the openings 42 are in register with openings 36, the stud heads 37 can pass therethrough. The slots 43 are only as wide as the diameter of the stud shanks 38, and when the rear guard 30 has been swung down as described, these slots 43 will then engage the shanks 38 to prevent the stud heads 37 from passing therethrough, at which time the front guard 35 will be securely locked in position.

The details of this construction are shown in Figures 5 and 6, while Figure 8 shows a modification accomplishing the same purpose, and in which bars 44 are disposed below the front plate 35 and provided at their outer ends with hooks 45 engageable with the shanks or stems of headed studs 46 fixed in the inner sides of the hood, supporting guides 47 being secured to the under side of the plate 35 in which the bars 44 are slidably engaged.

Pivotally attached to the end edges of the plate 35, as at 48, adjacently in front of the hinge 34, are arms 49, having their opposite ends secured by pivots 50$^A$ set in the carriage sides as shown in Figure 2.

In operation, the rear plate 30 is released by unlocking the hinge leaf element 32, and raised or folded over the front plate 35 until the stud heads have passed through the openings 36 and also the openings 42 in the locking bars, at that time in register.

Thereupon, by folding the rear plate 30 outwardly the plate 35 becomes securely engaged and the front plate 30 is then fastened by the hinge leaf element 32 and lock 33 which holds the structure firmly in place.

In releasing the plates the arms 49 will move into the position shown by the broken lines in Figure 2 and the plates take position at the foot end of the carriage, where they may be supported by suitable clips on the carriage end.

Considering the wheel braking or locking devices, that presented in Figures 2, 3, 4 and 7 will be seen to consist of a pair of metal strap-like bars 50 and 51 supported at their edges on the springs 20 to which they are secured by eyes 52 and 53 engaging posts 54 fixed in the springs. The ends of each bar are curved oppositely outward to engage the peripheries of the wheels 15 and 16 respectively, these curved ends 56 acting as brakes being properly shaped and adapted for that purpose, and for the further object of preventing removal of the wheels from the axles by mischievous or malicious persons.

The bar 50 has resting upon it, at a point near its center, hook-like elements 58 extending downward on its outer side and integrally formed with connecting rods 59 pivoted at 60 to the lower end of a lever arm 61, in turn pivoted at 62 to a bracket 63 abutting the outer surface of the other brake bar 51.

The other end 64 of the lever 61 is pivoted at 65 to the end of a tensioning rod 66 extending toward the handle and pivoted at its opposite end between a pair of angular lever bars 67 pivoted at 68 to the handle levers 24 and then brought convergingly inward, as at 69, to receive between them a rigid pin 70, acting as a handle for operating the lever bars in setting or releasing the brakes 56, the pin 70 being so disposed that when the brakes are in tight contact with the wheels, it can be firmly held by the hinge element 32, so that when it is locked the wheels are prevented from turning, due to the friction or clamping effect of the elements 56 at that time stressed.

Stop pins 71 are set in the handle lever bars against which the hand brake lever elements 69 normally rest when stressed.

In the modification shown in Figure 9, the elements 67, 68, 69 and 70 are dispensed with and in their place is substituted a single lever bar 75, pivotally engaged with the free end of the tension rod 66 and supported on a cross rail 76 pivoted between the handle lever bars 24.

The upper end of the lever 75 is formed into the shape of a spade handle, as at 77, and adapted to be engaged or not as desired by the hinge leaf 32 when the latter is locked, this arrangement permitting the separate and distinct operation of the braking device or the plate protecting means as may be desired.

It will be obvious that the brake actuating device may be reversed with respect to the vehicle so as to be operated from the other end thereof by slight modifications not involving invention and that other minor changes may be made without departing from the scope of the claims hereto appended.

Having thus described my invention, what I claim as new and desire to secure by Letters Patent, is:—

1. A baby carriage body protective device, comprising a body having a hood, of a pair of hingedly connected guards disposable over said body, means for automatically securing one of said guards to said hood when the other guard is extended, arms pivotally engaging the last named guard to the sides of said body, a lock fixed on the end of said body opposite said hood, and means carried by the last named guard engageable by said lock.

2. A baby carriage protective device comprising in combination with a carriage having side and end walls and a hood pivoted thereover at one end, of a pair of plates hingedly engaged and adapted to be disposed over the open body of said carriage, one of said plates having openings in its outer corners, studs fixed in the side walls of said body engageable in the mentioned openings, means for detachably engaging the studs therein, a hinge on the opposite edge of the other plate, and means carried on the end wall of said carriage body for locking the free leaf of said hinge.

3. A baby carriage protective device comprising in combination with a carriage having side and end walls and a hood pivoted thereover at one end, of a pair of plates hingedly engaged and adapted to be disposed over the open body of said carriage, one of said plates having openings in its outer corners, studs fixed in the side walls of said body engageable in the mentioned openings, means for locking said studs therein, arms pivoted on the side walls of the carriage at one end and engaging the edges of the plate at their other end, a pair of hinge elements, one being fixed on the other of said plates, and means for locking the other of said hinge elements to the end wall of said carriage.

4. A baby carriage body protective device, comprising a body having a hood, of a pair of hingedly connected front and rear guards of substantially equal area disposable over said body between said hood and body end, lever arms pivoted to the sides of said body and the rear guard, means fixed in said hood engageable with the front guard, means operated by unfolding the rear guard to secure said engaging means, means on the rear guard engageable with the end of said body, a locking means therefor, and a wheel braking device held in operation position by said engaging means.

5. A baby carriage body protective device, comprising a body having a hood, of a pair of hingedly connected front and rear guards disposable over said body, means for automatically securing front guard to said hood when the rear guard is extended, means for locking the rear guard to the body, and means associated with the first named guard for locking said hood against movement.

6. A baby carriage body protective device, comprising a body having a hood, of a pair of hingedly connected guards disposable over said body, means for automatically securing the front one of said guards to said hood when the rear guard is extended, arms pivotally engaging the last named guard to the sides of said body, a lock fixed on the end of said body opposite said hood, and means carried by the rear guard engageable by said lock, said guards when extended preventing pivotal movement of said hood.

7. A baby carriage body protective device, comprising a body having a hood, of a pair of hingedly connected front and rear guards disposable over said body, means for automatically securing the front guard to said hood when the rear guard is extended, arms pivotally engaging the last named guard to the sides of said body, a lock fixed on the end of said body opposite said hood, and means carried by the rear guard engageable by said lock, said arms preventing raising of the guards at their connecting hinge when the ends are secured.

8. A baby carriage body protective device, comprising a body having a hood, of a pair of hingedly connected guards of substantially equal area disposable over said body between said hood and body end, lever arms pivoted to the sides of said body and to the rear one of said guards, means fixed in said hood engageable with the front guard, means operated by unfolding the rear guard to secure said engaging means, means on the rear guard engageable with the end of said body, a locking means therefor, and a hand operated braking device engageable simultaneously with each of the four wheels of the carriage, said device being held in operative relation by said locking means.

9. A baby carriage body protective device, comprising a body having a hood, of a pair of hingedly connected guards of substantially equal area disposable over said body between said hood and body end, lever arms pivoted to the sides of said body and to the rear one of said guards, means fixed in said hood engageable with the front guard, means operated by unfolding the rear guard to secure said engaging means, means on the rear guard enagageable with the end of said body, a locking means therefor, and a hand operated brake engageable with either or both pairs of the carriage wheels.

10. A baby carriage braking device comprising in combination with the running gear and wheels, of a pair of spring bars pivoted on said running gear at points remote from each other and from their ends, a hand lever, means operated by said hand lever for springing said bars to deflect their ends towards said wheels, and hooks on the ends of said bars adapted to act as brake shoes when engaged with the peripheries of said wheels.

11. A baby carriage braking device comprising in combination with the frame of said carriage and wheels thereof, said wheels having circular tires, of a pair of spring bars having hooked ends adapted to partially encircle the tires, said bars being flexibly carried on said frame, and hand lever actuated means for flexing said bars to cause engagement or disengagement of the bar ends with said tires and prevent removal of the wheels from the carriage frame.

In testimony whereof I have signed my name to this application.

MICHAEL KAHNE.